United States Patent
Singh et al.

(10) Patent No.: US 11,610,046 B2
(45) Date of Patent: Mar. 21, 2023

(54) AUTOMATIC GENERATION OF RESPONSIVE FONT EFFECTS BASED ON FONT ELEMENTS

(71) Applicant: Adobe Inc., San Jose, CA (US)

(72) Inventors: Pawan Kishor Singh, Noida (IN); Nirmal Kumawat, Noida (IN); Saikat Chakrabarty, Noida (IN)

(73) Assignee: Adobe Inc., San Jose, CA (US)

( * ) Notice: Subject to any disclaimer, the term of this patent is extended or adjusted under 35 U.S.C. 154(b) by 143 days.

(21) Appl. No.: 16/667,119

(22) Filed: Oct. 29, 2019

(65) Prior Publication Data
US 2021/0124796 A1   Apr. 29, 2021

(51) Int. Cl.
G06F 40/10 (2020.01)
G06F 40/109 (2020.01)
G06T 11/00 (2006.01)

(52) U.S. Cl.
CPC .......... *G06F 40/109* (2020.01); *G06T 11/001* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,664,086 A * | 9/1997 | Brock | ...................... | G09G 5/24 345/468 |
| 5,740,462 A * | 4/1998 | Igarashi | .................. | G06K 15/02 345/472 |
| 6,323,864 B1 * | 11/2001 | Kaul | ...................... | G06F 40/109 345/467 |
| 6,426,751 B1 * | 7/2002 | Patel | ...................... | G06F 40/109 345/468 |
| 7,002,597 B2 * | 2/2006 | Arnold | .................. | G06F 40/109 345/611 |
| 7,735,020 B2 * | 6/2010 | Chaudhri | ............ | G06F 3/04847 715/833 |

(Continued)

OTHER PUBLICATIONS https://en.wikipedia.org/wiki/Glyph, Oct. 15, 2019.

(Continued)

*Primary Examiner* — Maikhanh Nguyen
(74) *Attorney, Agent, or Firm* — Kilpatrick Townsend & Stockton LLP

(57) ABSTRACT

A document authoring application receives a text input including one or more alphanumeric characters. A glyph extraction module in the application determines graphical data describing glyphs of the alphanumeric characters. From the graphical data, the glyph extraction module extracts visual elements, each visual element including a color or an outline from the glyphs. The glyph extraction module generates a responsive font effect that includes the extracted visual element applied to one or more of an underline effect, a strikethrough effect, a bullet point effect, or a list dot effect. Responsive to a modification of the text input, the glyph extraction module extracts an additional visual element from an additional glyph associated with the modified text. The responsive font effect is modified to include the additional visual element. The user interface is updated to display the responsive font effect or the modified font effect.

20 Claims, 10 Drawing Sheets
(7 of 10 Drawing Sheet(s) Filed in Color)

(56) References Cited

U.S. PATENT DOCUMENTS

| | | | | |
|---|---|---|---|---|
| 7,873,228 B2* | 1/2011 | Nicholson | ............... | G06V 10/26 382/187 |
| 8,330,760 B1* | 12/2012 | Arnold | ................. | G06T 11/203 345/469 |
| 8,640,024 B2* | 1/2014 | Mitchell | ............... | G06F 40/103 715/234 |
| 9,146,907 B1* | 9/2015 | Joshi | ................. | G06K 15/1827 |
| 9,208,132 B2* | 12/2015 | DeBlois | ............... | G06F 40/109 |
| 9,620,086 B1* | 4/2017 | Joshi | ...................... | G09G 5/28 |
| 9,741,142 B2* | 8/2017 | Dwivedi | ............ | G06K 9/6828 |
| 9,910,831 B2* | 3/2018 | Jung | ..................... | G06F 40/109 |
| 10,255,256 B2* | 4/2019 | Siegel | ................. | G06F 40/166 |
| 10,366,142 B2* | 7/2019 | Kukreja | ............. | G06F 40/109 |
| 10,497,158 B2* | 12/2019 | Jain | ....................... | G06F 40/109 |
| 10,699,166 B2* | 6/2020 | Wang | ............ | G06V 30/18057 |
| 10,950,017 B2* | 3/2021 | Kumawat | ........... | G06F 40/109 |
| 2002/0130871 A1* | 9/2002 | Hill | ....................... | G06T 11/203 345/467 |
| 2007/0189628 A1* | 8/2007 | Nolan | .................... | G06K 9/72 382/254 |
| 2007/0196021 A1* | 8/2007 | Nicholson | ............. | G06V 10/26 382/229 |
| 2013/0124962 A1* | 5/2013 | Mitchell | .............. | G06F 40/103 715/229 |
| 2014/0195901 A1* | 7/2014 | DeBlois | ............... | G06F 40/109 715/256 |
| 2014/0215324 A1* | 7/2014 | Siegel | .................. | G06F 40/103 715/256 |
| 2015/0091934 A1* | 4/2015 | Jung | .................... | G06T 11/001 345/589 |
| 2015/0097842 A1* | 4/2015 | Kaasila | ................ | G06F 40/194 345/471 |
| 2015/0332491 A1* | 11/2015 | Dwivedi | .............. | G06K 9/6215 345/636 |
| 2017/0098138 A1* | 4/2017 | Wang | .................. | G06K 9/6828 |
| 2017/0323007 A1* | 11/2017 | Kukreja | ................ | G06F 16/58 |
| 2018/0039401 A1* | 2/2018 | Freville | ................ | G06F 40/109 |
| 2018/0253878 A1* | 9/2018 | Jain | ......................... | G06T 11/60 |

OTHER PUBLICATIONS https://en.wikipedia.org/wiki/Font, Oct. 15, 2019.
https://www.colorfonts.wtf, Oct. 15, 2019.
https://helpx.adobe.com/in/fonts/using/ot-svg-color-fonts.html, Oct. 15, 2019.
https://docs.microsoft.com/en-us/typography/opentype/spec/post, Oct. 15, 2019.

* cited by examiner

US 11,610,046 B2

AUTOMATIC GENERATION OF RESPONSIVE FONT EFFECTS BASED ON FONT ELEMENTS

TECHNICAL FIELD

This disclosure relates generally to the field of computer-implemented typefaces, and more specifically relates to automatic generation of graphical elements in a computer-implemented font.

BACKGROUND

A document authoring application provides a user with one or more fonts that are usable to apply computer-implemented typefaces to a digital document. Each font may describe a typeface, such that the fonts may be used to modify an appearance of text that is included in the digital document. For example, the document authoring application may provide a user, such as a graphic designer or a webpage developer, a selection of fonts that describe multiple typefaces with a variety of artistic or aesthetic characteristics. The document authoring application may enable the user to efficiently select a typeface with aesthetic characteristics that are suitable for the digital document. The document authoring application may also enable the user to efficiently apply the selected typeface to the digital document, based on a font that is indicated by the user.

In some cases, a font is used to provide a font effect that is applied to text in the digital document, such as an underline effect, a strikethrough effect, a bullet point effect, or a list dot effect. The font may define a glyph for the font effect, such as glyph that describes the appearance of an underline character or a bullet point character. However, some fonts do not define glyphs for all characters, and may omit glyphs that describe appearances of one or more effect characters. Undefined characters in a font may prevent a user from applying the typeface that is described by the font, limiting the functionality of the font. In addition, undefined characters may cause the document authoring application to apply a default glyph that does not match the aesthetic characteristics of the selected font, resulting in a digital document that does not have the aesthetic characteristics that are intended by the user.

SUMMARY

According to certain embodiments, a glyph extraction module receives a text input. The text input includes one or more alphanumeric characters. The glyph extraction module determines graphical data that describes a glyph of the alphanumeric characters. The graphical data is from a font that describes a typeface applied to the text input. From the graphical data, the glyph extraction module extracts a visual element that is included in the glyph. The visual element includes one or more of a color or an outline of a portion of a glyph. The glyph extraction module generates a responsive font effect that includes the extracted visual element applied to one or more of an underline effect, a strikethrough effect, a bullet point effect, or a list dot effect. A user interface is updated to display the responsive font effect.

In some cases, the glyph extraction module receives a modification of the text input. The glyph extraction module determines an additional glyph of an additional alphanumeric character that is associated with the modification. The glyph extraction module extracts an additional visual element from additional graphical data describing the additional glyph. The glyph extraction module modifies the responsive font effect, such that the modified font effect includes the additional visual element. The user interface is updated to display the modified font effect.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawings will be provided by the Office upon request and payment of the necessary fee.

Features, embodiments, and advantages of the present disclosure are better understood when the following Detailed Description is read with reference to the accompanying drawings, where.

DETAILED DESCRIPTION

Figure 1:
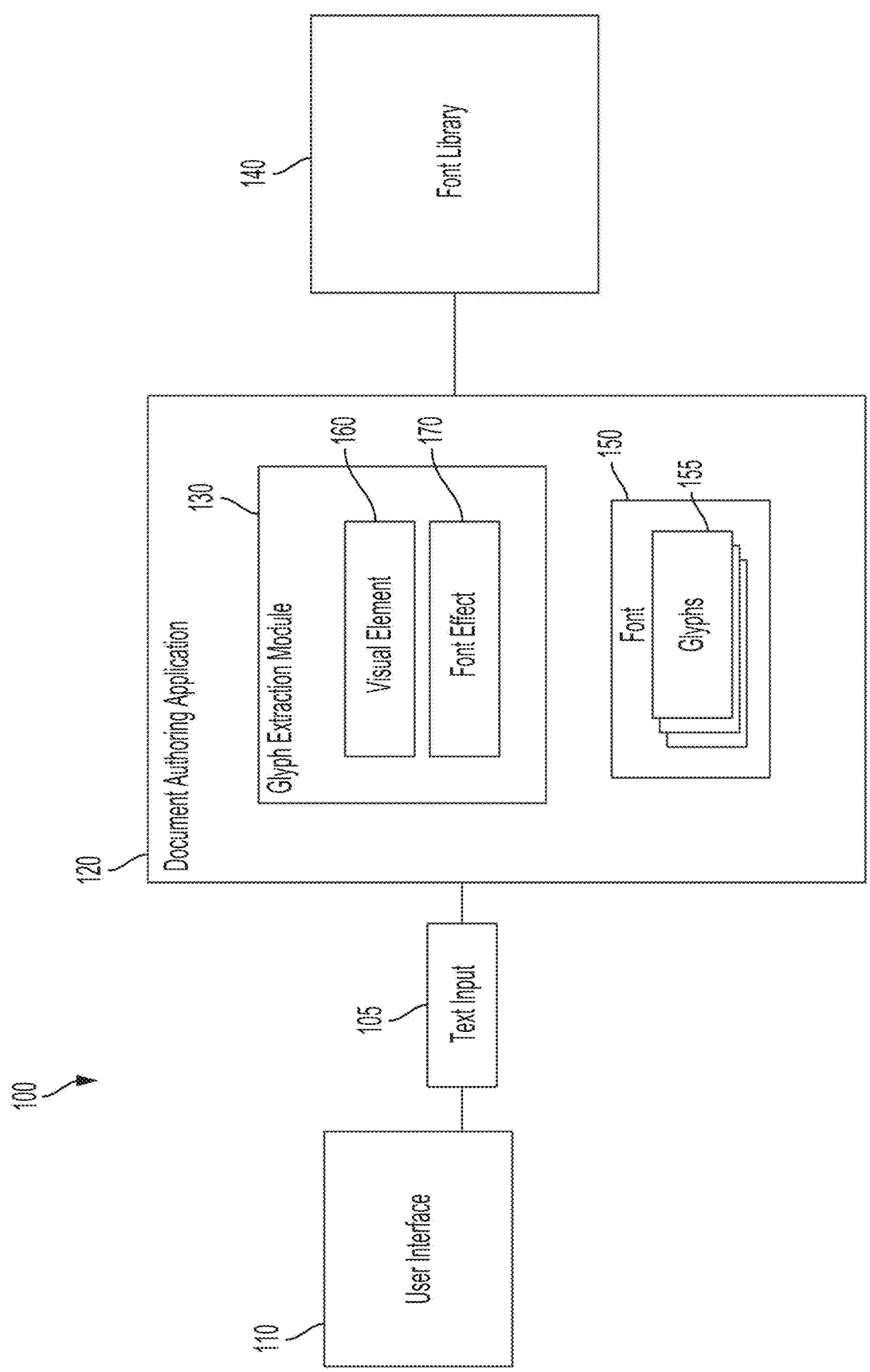
FIG. 1 is a block diagram depicting an example of a computing environment in which responsive font effects are generated based on glyphs included in a font, according to certain embodiments.

Prior techniques for generating font effects do not automatically generate font effects based on an appearance of a font. Certain embodiments described herein provide for automatic generation of font effects based on visual elements of glyphs in a font applied to text, such that the text has the appearance of the applied font. In some cases, the automatically generated font effects are responsive font effects that are updated automatically in response to a modification of a text input.

The following examples are provided to introduce certain embodiments of the present disclosure. A document authoring application receives a request describing text in a document that is being authored. The request can indicate a font describing a typeface that is applied to the text. The request can also indicate a font effect that is applied to the text. Applying the font to the text can include displaying alphanumeric characters of the text with the appearance described by the font. Applying the font effect to the text can include displaying a combination of the text characters with one or more of an underline effect, a strikethrough effect, a bulleted list effect, a list dot effect, or other appropriate font effect.

In this example, a glyph extraction module included in (or otherwise in communication with) the document authoring application receives a text input describing the request. The text input can indicate the requested font, or the alphanumeric characters of the requested text, or both. The glyph extraction module determines glyphs in the font that describe an appearance of the characters, and extracts visual elements from graphical data in the glyphs. The visual elements include one or more of a color of a portion of a glyph, or an outline of a portion of a glyph. Based on the visual elements, the glyph extraction module generates one or more font effects that have an appearance consistent with the font. For example, if one of the glyphs includes visual elements that are colored red, blue, and orange, the generated font effect could have an appearance that is colored red, blue and orange. As an additional example, if another of the glyphs includes a visual element that has a wavy outline, the generated font effect (or an additional generated font effect) could have an appearance with the wavy outline.

Continuing with this example, one or more of the generated font effects are applied to the characters in the text input by the document authoring application. Applying the generated font effects includes displaying, in a user interface, a combination of the generated font effect and the glyphs of the characters. For instance, the document authoring application displays the characters from the text input having the appearance of the example glyphs with red, blue, and orange colors and the wavy outline. The document authoring application displays the characters in combination with the example generated font effect (or effects) having the appearance of the red, blue, and orange colors and the wavy outline.

In some cases, the generated font effect are responsive font effects that respond to a modification of the text input, such as a modified text input that adds or deletes characters, or indicates a different font. Responsive to the modified text input, the glyph extraction module automatically modifies the responsive font effects, based on additional glyphs associated with the modified text input. Continuing with the above example, if the text input is modified to indicate another character (or another font) that has a glyph colored purple, the glyph extraction module generates an additional font effect with an appearance that is colored purple. The user interface is updated to display a combination of the modified characters with the additional font effect.

Certain embodiments provide improvements to computing systems used for authoring digital content. For example, a font that provides a desired typeface appearance may have one or more undefined characters, such as characters for underline, strikethrough, bullet points, list dots, or other font effects. A conventional computing system may apply a different font to the undefined characters, causing the conventional system to generate non-uniform digital content that has a displeasing appearance. A content author who is using a conventional computing system may be unable to apply the desired font uniformly to digital content, or may undergo intensive labor to create additional graphical data to complete the undefined characters in the desired font. In this automated process, a glyph extraction module provides a font effect that is based on graphical information from the desired font indicated by the user. The glyph extraction module generates additional characters, such as to complete a font that has undefined characters. The particular rules used to automate this process can improve the operation of software tools used to create digital content, such as by reducing manual effort associated with creating additional graphical data to complete undefined characters in a font.

Referring now to the drawings, FIG. 1 is a diagram depicting a computing environment 100 in which responsive font effects are generated based on glyphs included in a font. In FIG. 1, a document authoring application 120 includes a glyph extraction module 130. The document authoring application 120 is configured to receive inputs and provide outputs via a user interface 110. The user interface 110 is capable of receiving input, such as input that is provided via a keyboard, mouse, touchpad, microphone, or other user input device. In addition, the user interface 110 is capable of providing output, such as output that is displayed via a monitor, touchscreen, speaker, or another display device capable of indicating an output. The document authoring application 120 is capable of exchanging data with the user interface 110, such as via a communication bus (e.g., if the user interface 110 and the document authoring application 120 are implemented by a particular computing system) or via a network connection (e.g., if the user interface 110 and the document authoring application 120 are implemented by multiple computing systems).

In the computing environment 100, a text input 105 is received via the user interface 110, such as by a computing system implementing one or more of the user interface 110 or the document authoring application 120. The text input 105 includes one or more alphanumeric characters. The document authoring application 120 receives the text input 105 from the user interface 110. In some cases, the document authoring application 120 receives additional data indicating a typeface that is to be applied to the text input. The additional data indicates, for example, a font 150 that describes an appearance of the typeface applied to the text input 105. In some cases, the additional data indicating the typeface or font is included with the text input 105. Additionally or alternatively, the document authoring application 120 receives the additional data from another source, such as via an additional input from the user interface 110 or from an additional computing system.

The document authoring application 120 receives, or otherwise accesses, the font 150 describing the indicated typeface. In some cases, the document authoring application 120 receives the font 150 from a font library 140 that includes multiple fonts describing multiple typefaces. Additionally or alternatively, a computing system implementing the document authoring application 120 stores the font 150 locally. In some cases, the font 150 is a vector font that includes graphical data stored in a vector format (e.g., scalable vector graphics data, "SVG data"). The font 150 includes multiple glyphs 155. Each of the glyphs 155 includes graphical data (such as, but not limited to, SVG data) that describes an appearance of a respective character (e.g., a letter, a number, a punctuation mark). The glyphs 155 describe, for example, the appearance of the alphanumeric characters included in the text input 105. Additionally or alternatively, the glyphs 155 describe the appearance of additional glyphs from the font 150, such as glyphs of characters that are not included in the text input 105. In some cases, the font 150 includes additional graphical data, such as additional glyphs for alphanumeric characters that are omitted from the text input 105, or graphical data for characters that do not necessarily have an appearance described by a glyph, such as a carriage return character or a tab character.

In FIG. 1, the glyph extraction module 130 determines, from the glyphs 155, graphical data that describes the respective glyphs of each alphanumeric character included in the text input 105. Additionally or alternatively, the glyph extraction module 130 extracts one or more visual elements 160 from the graphical data. Extraction of a visual element can include creating a copy of graphical data describing a portion of one or more glyphs For instance, the glyphs 155 can include multiple portions (e.g., vector paths) having colors and outlines. The extracted visual elements 160 include graphical data (e.g., a copy of a vector path, a copy of a portion of a vector path) representing one or more of the portions of at least one of the glyphs 155. If an example alphanumeric character "A" is included in the text input 105, the glyph extraction module 130 could extract one or more of the visual elements 160 from one of the glyphs 155 that describes an appearance of the letter "A" in the font 150. In some cases, the visual elements 160 include one or more colors extracted from the glyphs 155, such as a color from the example "A" glyph. Additionally or alternatively, the visual elements 160 include one or more outlines from the glyphs 155, such as an outline of a portion of the example "A" glyph.

In the computing environment 100, the glyph extraction module 130 generates a font effect 170 that includes one or more of the extracted visual elements 160. In some cases, the visual elements 160 are extracted from the glyphs 155 that are associated with the characters in the text input 105. Additionally or alternatively, the glyph extraction module 130 could generate the font effect 170 using one or more colors or outlines extracted from the glyphs 155. If the glyph of the example character "A" has a first portion with a red color and a wavy outline and a second portion with a blue color and a wavy outline, the glyph extraction module 130 could extract visual elements including the red and blue colors and the wavy outline. Continuing with this example, the glyph extraction module 130 could generate the font effect 170 having an appearance that includes the red and blue colors and the wavy outline that are included in the visual elements 160.

The font effect 170 could include a linear effect character, such as an underline effect or a strikethrough effect. Additionally or alternatively, the font effect 170 could include a dot effect character, such as a bullet point effect or a list dot effect. In some cases, the user interface 110 is updated to display the font effect 170. In some embodiments, the font effect 170 is a responsive font effect that is modifiable responsive to a modification of the text input 105. For example, the user interface 110 receives an additional input indicating a modification to the text input 105. If the text input 105 includes the example character "A" as described above, the modification could indicate the example characters "ABC." Responsive to the modification of the text input 105, the document authoring application 120 modifies the glyphs 155. For example, the document authoring application 120 receives one or more additional glyphs that indicate an appearance of the additional alphanumeric characters in the modified text input 105. In some cases, one or more glyphs could be removed from the glyphs 155, such as if a character that had previously been included in the text input 105 is omitted from the modified text input 105.

Based on the modification to the glyphs 155, the glyph extraction module 130 modifies the visual elements 160. For example, the modified visual elements 160 could include (or omit) a color or outline that is included in (or omitted from) the modified glyphs 155. Responsive to the modification of the visual elements 160, the font effect 170 is modified. For example, the glyph extraction module 130 modifies the font effect 170 to include (or omit) a color or outline that is included in (or omitted from) the modified visual elements 160.

In FIG. 1, the visual elements 160 are described as including visual elements extracted from the glyphs 155, which are associated with the characters in the text input 105. However, other implementations are possible. For example, the glyph extraction module 130 could extract visual elements from any glyph included in the font 150, including (without limitation) glyphs associated with characters omitted from the text input 105. In such cases, a font effect may be generated based on visual elements extracted from any glyph included in the font 150, including glyphs associated with characters omitted from the text input 105.

Figure 2:
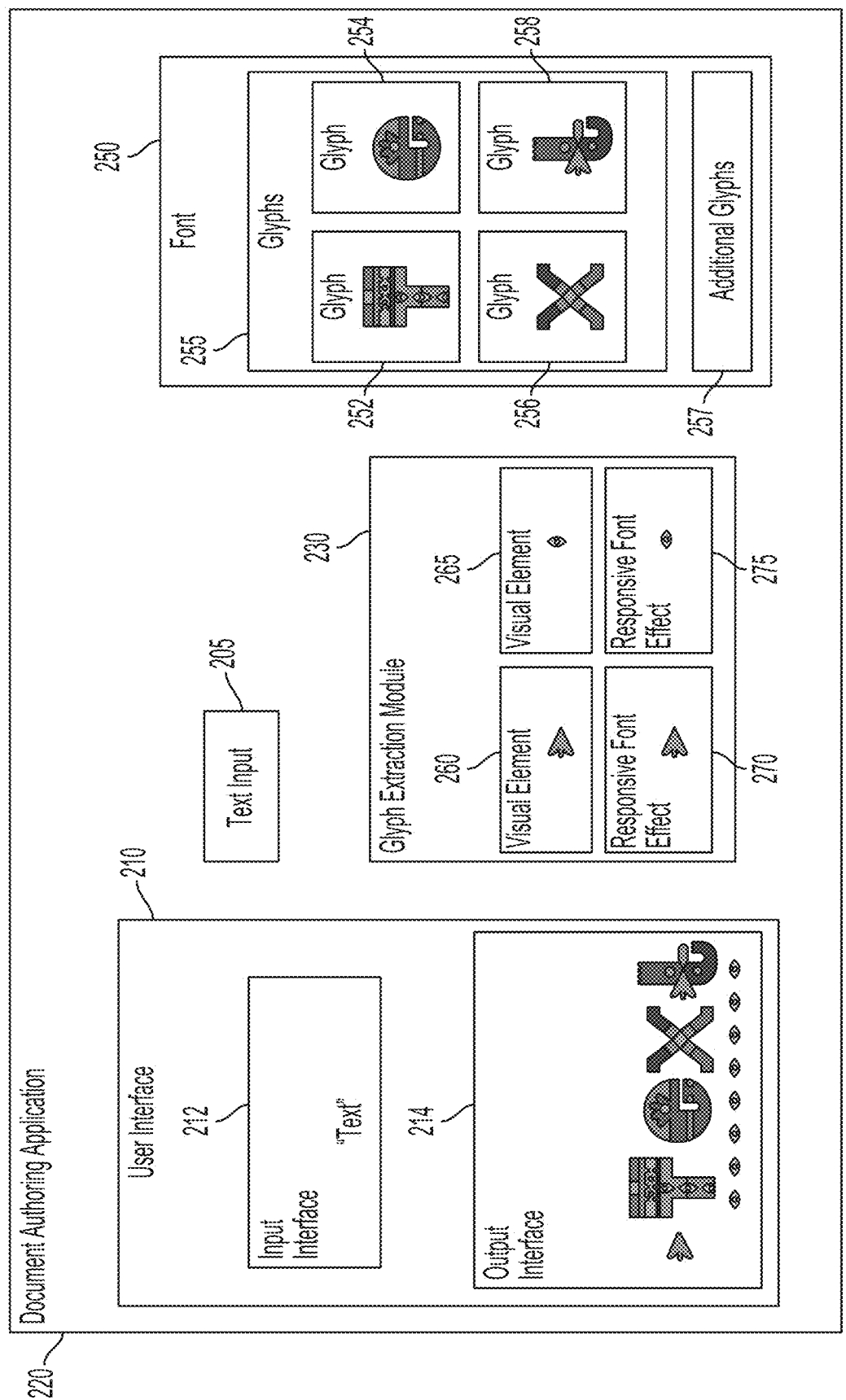
FIG. 2 is a block diagram depicting an example of a document authoring application that is capable of generating font effects that are responsive to a text input, according to certain embodiments.

FIG. 2 is a diagram depicting an example of a document authoring application 220 that is capable of generating font effects that are responsive to a text input. In FIG. 2, the document authoring application 220 includes a glyph extraction module 230 and a user interface 210, but other implementations are possible. For example, the document authoring application 220 could be implemented on a first computing system, and configured to communicate with additional computer systems in an example computing network (e.g., cloud computing networks, software-as-a-service implementations). In the example computing network, the document authoring application 220 could be configured to communicate with a user interface that is implemented on a second computing system, or further configured to communicate with a glyph extraction module implemented on a third computing system. In some cases, the document authoring application 220, glyph extraction module 230, and user interface 210 are respective examples of the document authoring application 120, glyph extraction module 130, and user interface 110, as described in regards to FIG. 1.

The user interface 210 is capable of receiving input via an input interface 212, and is further capable of providing output via an output interface 214. The user interface 210 receives, via the input interface 212, one or more characters of text. For example (and not by way of limitation), FIG. 2 depicts the user interface 210 as having received the example alphanumeric characters "Text" in the input interface 212. The document authoring application 220 receives a text input 205 that includes data indicating the text characters entered via the input interface 212.

Additionally or alternatively, the document authoring application 220 receives an indication of a font 250. The font 250 describes a typeface that is applied to the characters of the text input 205. The font 250 includes one or more glyphs, each glyph including graphical data describing an appearance of a respective character that is associated with the glyph. In FIG. 2, the font 250 is a vector font, in which each glyph includes SVG data describing the glyph's respective character. For example, a particular glyph 252 that describes a character "T" may include SVG data having multiple vector paths, each path having an outline and a color. The SVG data in the particular glyph 252 may indicate a combination of the multiple vector paths, such that the combination of the paths provides (e.g., when rendered on a display device) an appearance of the character "T" according to the typeface of font 250. For example, the SVG data may indicate a spatial combination of the vector paths, such that each path has a particular position relative to the other paths in the glyph 252. In some cases, the SVG data may indicate a temporal combination of the vector paths, such that each path is visible at a particular time relative to the other paths in the glyph 252 (e.g., an animated font).

In some embodiments, the glyph extraction module 230 determines, from the font 250, a set of glyphs 255 that are associated with the characters of the text input 205. Based on the example alphanumeric characters "Text," the glyph extraction module 230 determines that the character "T" is described by the glyph 252, the character "e" is described by a glyph 254, the character "x" is described by a glyph 256, and the character "t" is described by a glyph 258. In some cases, the font 250 includes additional glyphs 257, which are uncorrelated with the characters of the text input 205. FIG. 2 depicts a diagrammatic representation of an example appearance of the glyphs 252, 254, 256, and 258, but other appearances are possible, such as an additional typeface described by an additional font.

In the document authoring application 220, the glyph extraction module 230 extracts one or more visual elements from one or more glyphs included in the set of glyphs 255. The extraction of the visual element by the glyph extraction module 230 includes, for instance, creating a copy of graphical data describing a portion of one or more glyphs. For example, the glyph extraction module 230 extracts, from the glyph 258, a visual element 260 that includes an outline from a vector path describing part of a crossbar of the example character "t." In addition, the glyph extraction module 230 extracts, from the glyph 252, a visual element 265 that includes multiple outlines from multiple vector paths describing part of an upright of the example character "T." In FIG. 2, the visual elements 260 and 265 include outline elements and also color elements (e.g., colors indicated by the SVG data for the extracted vector paths), but other implementations are possible. For example, a visual element could include color information that omits outline information, or outline information that omits color information.

The glyph extraction module 230 generates one or more responsive font effects that include at least one of the extracted visual elements 260 and 265. In FIG. 2, the responsive font effect 270 is a dot effect that is based on the visual element 260. For example, the responsive font effect 270 includes a first vector path having a color or outline that are similar to a color or outline in a second vector path of the visual element 260. Additionally or alternatively, the responsive font effect 275 is a linear effect that is based on (e.g., has a similar vector path) the visual element 265. In some cases, a responsive font effect has an appearance that is identical to an appearance of a visual element. For example, the responsive font effect 270 has an appearance identical to that of the visual element 260. Additionally or alternatively, a responsive font effect has an appearance that is modified from an appearance of a visual element. For example, the appearance of the responsive font effect 275 includes a rotation of the visual element 265.

In the document authoring application 220, one or more of the responsive font effects 270 or 275 are applied to an additional character that is combined with the characters of the text input 205. For example, the glyph extraction module 230 generates a bullet point graphical element by applying the responsive font effect 270 to a bullet point character. Additionally or alternatively, the glyph extraction module 230 generates an underline graphical element by applying the responsive font effect 275 to an underline character. The bullet point graphical element (e.g., a character having the appearance of the responsive font effect 270) and the underline graphical element (e.g., a character having the appearance of the responsive font effect 275) are displayed via the user interface 210. For example, the output interface 214 displays the bullet point graphical element in front of the glyphs depicting the appearance of the example characters "Text," and further displays the underline graphical element below the example "Text" glyphs.

In some embodiments, one or more of the responsive font effects 270 or 275 are modified responsive to a modification to the text input 205. For example, the user interface 210 receives one or more additional characters entered in the input interface 212. Additionally or alternatively, characters that are entered in the input interface 212 could be deleted. As a non-limiting example, the example characters "Text" could be modified to "Test." Responsive to determining the modification of the text input 205, the glyph extraction module 230 modifies the set of glyphs 255. For example, one or more glyphs from the additional glyphs 257, such as a glyph describing the example added character "s," may be added to the glyphs 255. Additionally or alternatively, one or more glyphs are removed from the glyphs 255, such as a glyph describing the example deleted character "x."

The glyph extraction module 230 modifies the visual elements 260 and 265 that are extracted from the modified set of glyphs 255, such as by extracting one or more additional visual elements or by removing one or more of the extracted visual elements. Responsive to the modification of the visual elements, one or more of the responsive font effects 270 or 275 may be modified. For example, the responsive font effect 270 may be modified to have a different visual element, an additional color, an additional outline, or another suitable modification. The modified responsive font effect 270 may be applied to the bullet point character, or the modified responsive font effect 275 may be applied to the underline character. Additionally or alternatively, the characters displayed via the output interface 214 are modified. For example, the output interface 214 is updated to display the example modified "Texture" glyphs combined with the modified bullet point graphical element.

Figure 3:
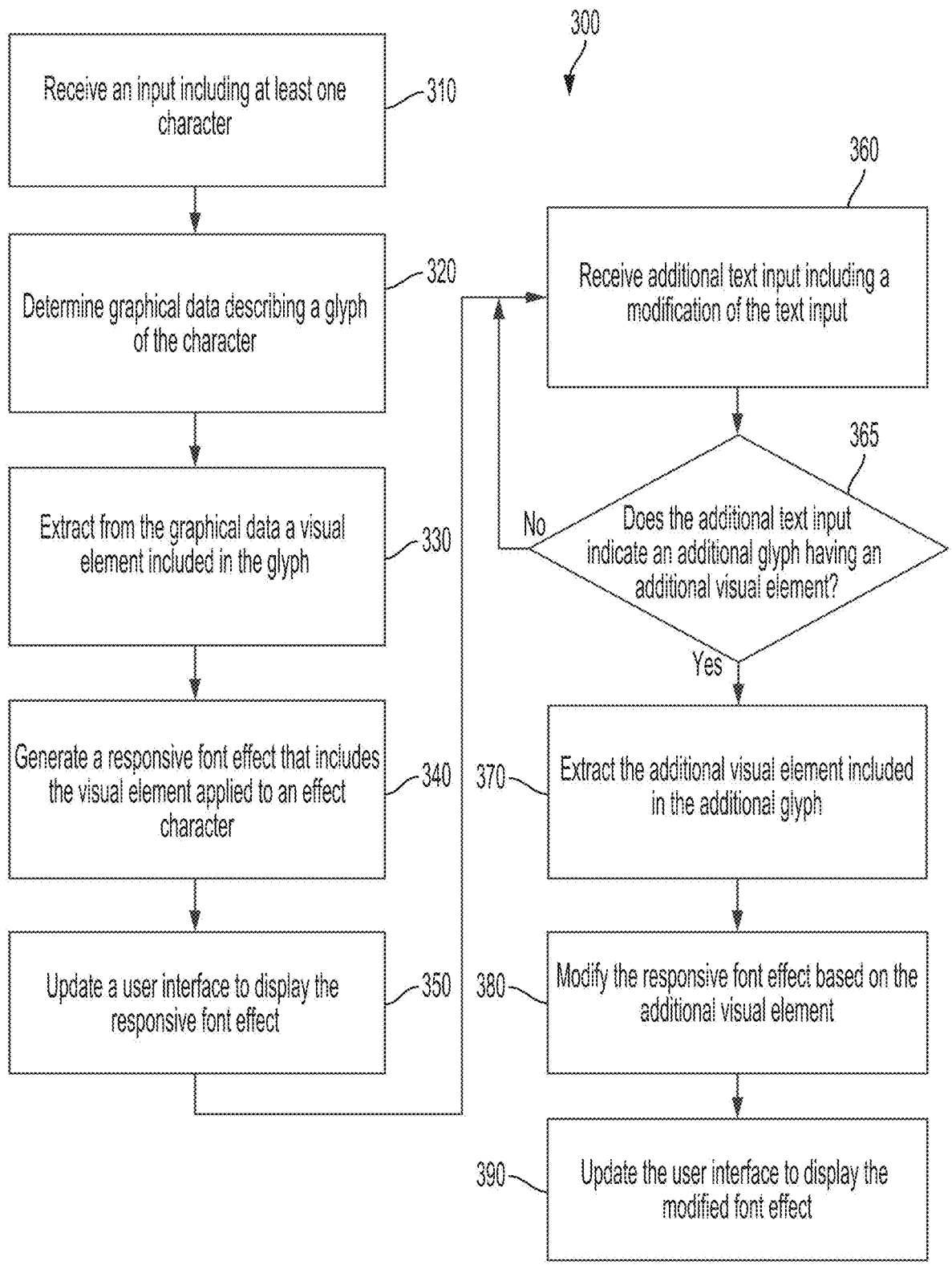
FIG. 3 is a flow chart depicting an example of a process for generating responsive font effects, according to certain embodiments.

FIG. 3 is a flow chart depicting an example of a process 300 for generating responsive font effects. In some embodiments, such as described in regards to FIGS. 1-2, a computing device executing a document authoring application implements operations described in FIG. 3, by executing suitable program code. For illustrative purposes, the process 300 is described with reference to the examples depicted in FIGS. 1-5. Other implementations, however, are possible.

At block 310, the process 300 involves receiving a text input that includes at least one alphanumeric character. For example, the document authoring application 120 receives the text input 105 via the user interface 110. In some cases, the text input 105 includes data describing one or more of the at least one alphanumeric character, a typeface that is to be applied to the text input, or a font (e.g., a vector font, a raster font, a TrueType font) that describes the typeface.

At block 320, the process 300 involves determining graphical data that describes a glyph of the at least one alphanumeric character. The graphical data is determined, for instance, from the font that describes the typeface applied to the text input. In the document authoring application 220, the glyph extraction module 230 identifies one or more of the glyphs 255 from the font 250. In some cases, each of the glyphs 255 is identified as being associated with a respective character included in the text input 205. For instance, the glyph 256 is identified as being associated with the character "x." The glyph extraction module 230 determines respective graphical data in each of the glyphs 255, the respective graphical data describing an appearance of the respective associated character. For instance, the glyph 256 includes graphical data describing the appearance of the character "x," such as a vector path having a green color and a diamond outline for a center portion of the character, vector paths having a pink color and rectilinear outlines for arm portions of the character, and vector paths having blue or purple colors and angled outlines for serif portions of the character.

At block 330, the process 300 involves extracting, from the graphical data, a visual element that is included in the glyph described by the graphical data. The visual element can include one or more of color of a portion of the glyph or an outline of a portion of the glyph. For example, the glyph extraction module 130 extracts from the glyphs 155 one or more visual elements 160 by identifying and copying a visual element of a particular glyph (e.g., sampling a color, sampling an outline). The visual elements 160 include, for example, a color or an outline of a vector path that is described by one or more of the glyphs 155. Continuing with the example glyph 256, the glyph extraction module 230 could extract, from the vector paths of the glyph 256, one or more of the green color, pink color, blue color, or purple color, and include the extracted colors in the visual elements 160. Additionally or alternatively, the glyph extraction module 230 could extract, from the vector paths of the glyph 256, one or more of the diamond outline, rectilinear outlines, or angled outlines, and include the extracted outlines in the visual elements 160. As a non-limiting example, the glyph extraction module 230 could extract the blue color from a first vector path and the pink color from a second vector path, by creating a copy of the graphical data describing the blue color and the pink color and including the copied graphical data in the visual elements 160.

At block 340, the process 300 involves generating a responsive font effect that includes the extracted visual element applied to an effect character. In some cases, the effect character is one or more of an underline effect, a strikethrough effect, a bullet point effect, or a list dot effect. For example, the glyph extraction module 130 generates the font effect 170 by applying the visual element 160 to a font effect that describes a linear effect or a dot effect. Applying the visual element 160 to the font effect can include generating a graphical element that is associated with the font effect, such that when the font effect is displayed (e.g., on a user interface), the font effect is displayed with the appearance of the generated graphical element. Continuing with the above example of the extracted pink and blue colors, the glyph extraction module 230 could generate a pink and blue graphical element that is associated with the bullet point effect, such that the bullet point effect has the appearance of the pink and blue graphical element when displayed (e.g., displayed via the output interface 214).

At block 350, the process 300 involves updating a user interface to display the responsive font effect. The user interface 110, for example, is updated to display the font effect 170. In some cases, the font effect 170 is displayed in combination with one or more of the characters from the text input 105. For example, the user interface 110 could display the characters having the typeface appearance indicated by the font 150, and further having the font effect 170 applied to the characters (e.g., underlined, with strikethrough, bulleted, listed). In some embodiments, updating a user interface includes one or more of generating update instructions for a user interface included in a same computing system, or generating update instructions for transmission to a user interface included in an additional computing system. In FIG. 2, for example, the document authoring application 220 can generate or update display instructions that are used by the user interface 210 included within the document authoring application 220. Additionally or alternatively, the document authoring application 120 in FIG. 1 can generate or update display instructions that are transmitted from a computing system on which the document authoring application 120 operates to an additional computing system on which the user interface 110 operates, such that the user interface 110 displays data (or updates a display of data) responsive to the transmitted display instructions.

In some embodiments, a responsive font effect is modified responsive to a modification of text input. At block 360, the process 300 involves receiving additional text input that includes a modification to the text input. For example, the text input 105 is modified based on an additional input to the user interface 110. A modification to the text input 105 may include one or more of addition of a character, deletion of a character, modifying a sequence of characters, modifying a font that is applied to the text input (e.g., selecting a different typeface), or any other suitable modification or combination of modifications.

At block 365, the process 300 involves determining whether the additional text input indicates an additional glyph having one or more additional visual elements. If the text input 105 is modified to include an additional alphanumeric character, for instance, the additional glyph could include one or more additional visual elements. Additionally or alternatively, if the text input 105 is modified to indicate a second font other than the font 150, the additional glyph could include one or more additional visual elements describing a second typeface of the second font. The glyph extraction module 130 determines if an additional glyph is indicated by the modification to the text input 105, such as by identifying an additional character in the modified text input 105, or by identifying that the modified text input 105 indicates a second font.

If operations related to block 365 determine that the additional text input does not indicate an additional glyph with additional visual elements, the process 300 proceeds to another block, such as block 310, 350, or 360. If operations related to block 365 determine that the additional text input indicates an additional glyph with additional visual elements, the process 300 can determine a modification to the responsive font effect.

At block 370, the process 300 involves extracting, from the additional glyph, one or more of the additional visual elements. For instance, the glyph extraction module 130 modifies the visual elements 160 to include an additional visual element from the additional glyph associated with the modified text input 105. Extraction is performed as described in regards to block 330, such as by extracting the additional visual element from a vector path of the additional glyph. In some cases, a visual element is omitted from the modified visual elements 160. For instance, the glyph extraction module 130 could omit a visual element that had been previously extracted from a glyph of a deleted character (e.g., deleted in the modification of the text input 105).

In some cases, omitting a visual element may provide a responsive font effect that remains consistent with glyphs of the modified text.

At block 380, the process 300 involves modifying the responsive font effect. In some cases, the modified responsive font effect includes the additional extracted visual elements. The glyph extraction module 130, for example, modifies the font effect 170 to include the additional visual element from the additional glyph associated with the modified text input 105. In some cases, modifying a responsive font effect includes omitting a font effect, or portion of a font effect. For example, if the text input 105 is modified to delete a character, the glyph extraction module 130 could omit a particular visual element extracted from a glyph associated with the deleted character. Additionally or alternatively, the glyph extraction module 130 could modify the font effect 170 to omit the font effect that is based on the omitted visual element (e.g., the modified font effect 170 is based on visual elements for characters included in the modified text input 105, not on deleted characters).

At block 390, the process 300 involves updating the user interface to display the modified font effect. In some cases, the modified font effect is displayed in combination with the characters of the modified text input. For example, the user interface 110 is updated to display characters from the modified text input 105 in combination with the modified font effect 100. In some embodiments, updating the user interface includes one or more of generating update instructions for the user interface, or transmitting generated update instructions to a user interface included in an additional computing system.

In some embodiments, operations related to the process 300 are repeated. For example, one or more operations related to blocks 360, 365, 370, 380, or 390 are repeated responsive to additional modifications of the text input. Additionally or alternatively, one or more operations related to blocks 320, 330, or 340 are repeated for additional glyphs associated with additional characters in the text input.

In some embodiments, multiple responsive font effects are generated from one or more extracted visual elements. Additionally or alternatively, the multiple responsive font effects are displayed via a user interface. For example, the user interface may be configured to display the multiple responsive font effects and to receive an input indicating a selection of one or more of the displayed font effects. In some cases, the user interface is updated responsive to modifications of the multiple responsive font effects, such as adding a displayed font effect based on additional characters entered in the user interface, or omitting a previously displayed font effect based on a character deleted via the user interface.

Figure 4:
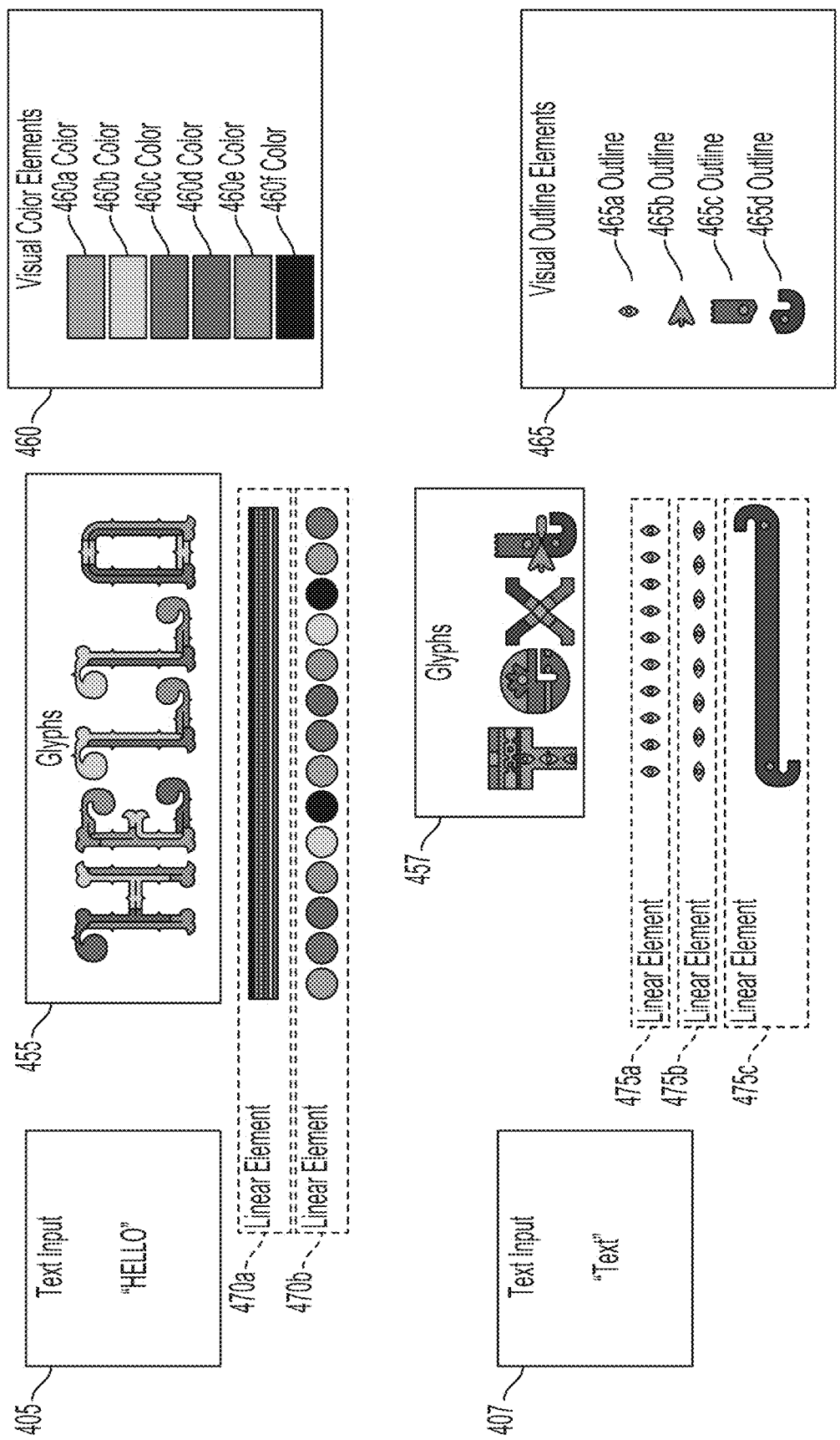
FIG. 4 is a block diagram depicting examples of responsive linear font effects generated from extracted visual elements, according to certain embodiments.

FIG. 4 depicts diagrammatic examples of responsive linear effects generated from extracted visual elements. The responsive linear effects could include graphical elements generated by a glyph extraction module. In some cases, a linear effect, such as an underline effect or a strikethrough effect, is generated or modified responsive to alphanumeric characters included in a text input.

As a first non-limiting example, the example characters "HELLO" are included in a text input 405. A glyph extraction module determines one or more glyphs 455 associated with the example characters in the text input 405, such as described in regards to FIGS. 1-3. Additionally or alternatively, the glyph extraction module extracts from the glyphs 455 one or more visual elements including the visual color elements 460. The visual color elements 460 include one or more colors that are included in the graphical data of the glyphs 455, such as colors 460a, 460b, 460c, 460d, 460e, and 460f. In some cases, the visual elements extracted from the glyphs 455 include one or more visual outline elements.

In some embodiments, the glyph extraction module generates one or more responsive linear effects that include at least one of the visual color elements 460. For example, the glyph extraction module generates graphical elements including a linear element 470a and a linear element 470b, each of which includes at least one of the colors 460a-460f. The example linear element 470a is depicted as having a vertical linear combination of each of the colors 460a-460f, but other implementations are possible, such as a horizontal linear combination, an angled linear combination, a combination of a subset of the colors 460a-460f, or any other suitable combination. In some cases, one or more particular colors included in the linear elements 470a or 470b are selected responsive to an input, such as an input received via the user interface 110.

As a second non-limiting example, the example characters "Text" are included in a text input 407. The glyph extraction module determines one or more glyphs 457 associated with the example characters in the text input 407. Additionally or alternatively, the glyph extraction module extracts from the glyphs 457 one or more visual elements including the visual outline elements 465. The visual outline elements 465 include one or more outlines that are included in the graphical data of the glyphs 457, such as outlines 465a, 465b, 465c, and 465d. In some cases, the visual elements extracted from the glyphs 457 include one or more visual color elements.

In some embodiments, the glyph extraction module generates one or more responsive font effects that include at least one of the visual outline elements 465. For example, the glyph extraction module generates graphical elements including a linear element 475a, a linear element 475b, and a linear element 475c, each of which include at least one of the outlines 465a-465d. In some cases, a linear element includes a modified outline element, a combination of multiple outline elements, or multiple instances of an outline element. In some cases, a modified outline has one or more of a modified orientation (e.g., rotated), a modified color, a modified shape (e.g., removing a portion of the outline shape), a modified dimension, or any other suitable modification. The example linear element 475a is depicted as a lateral combination of multiple lateral instances of the outline 465a. The example linear element 475b is depicted as a lateral combination of multiple modified (e.g., rotated) lateral instances of the outline 465a. The example linear element 475c is depicted as a lateral combination of modified instances of the outline 465d and an additional element having a color associated with the outline 465d. In some cases, one or more particular outlines included in the linear elements 475a, 475b, or 475c are selected responsive to an input, such as an input received by the user interface 110.

In some embodiments, a linear element has an effect length that is calculated from one or more characters that are combined with the linear element. For example, one or more of the document authoring application 120 or the glyph extraction module 130 determines a character length associated with the example characters "HELLO" included in the text input 405. In some cases, the character length is calculated from a size (e.g., width, length, quantity of pixels) of the glyphs 455 that are associated with the characters in the text input 405. Additionally or alternatively, an effect length of the linear elements 470a and 470b is determined from the character length of the glyphs 455. For example, the effect length is calculated (e.g., by the document authoring application 120) to be similar to the character length, such that a displayed combination of the glyphs 455 and one or more of the linear elements 470a and 470b has a consistent visual appearance (e.g., an underline character or a strikethrough character has a similar length as the glyphs that are underlined or struck through).

Figure 5:
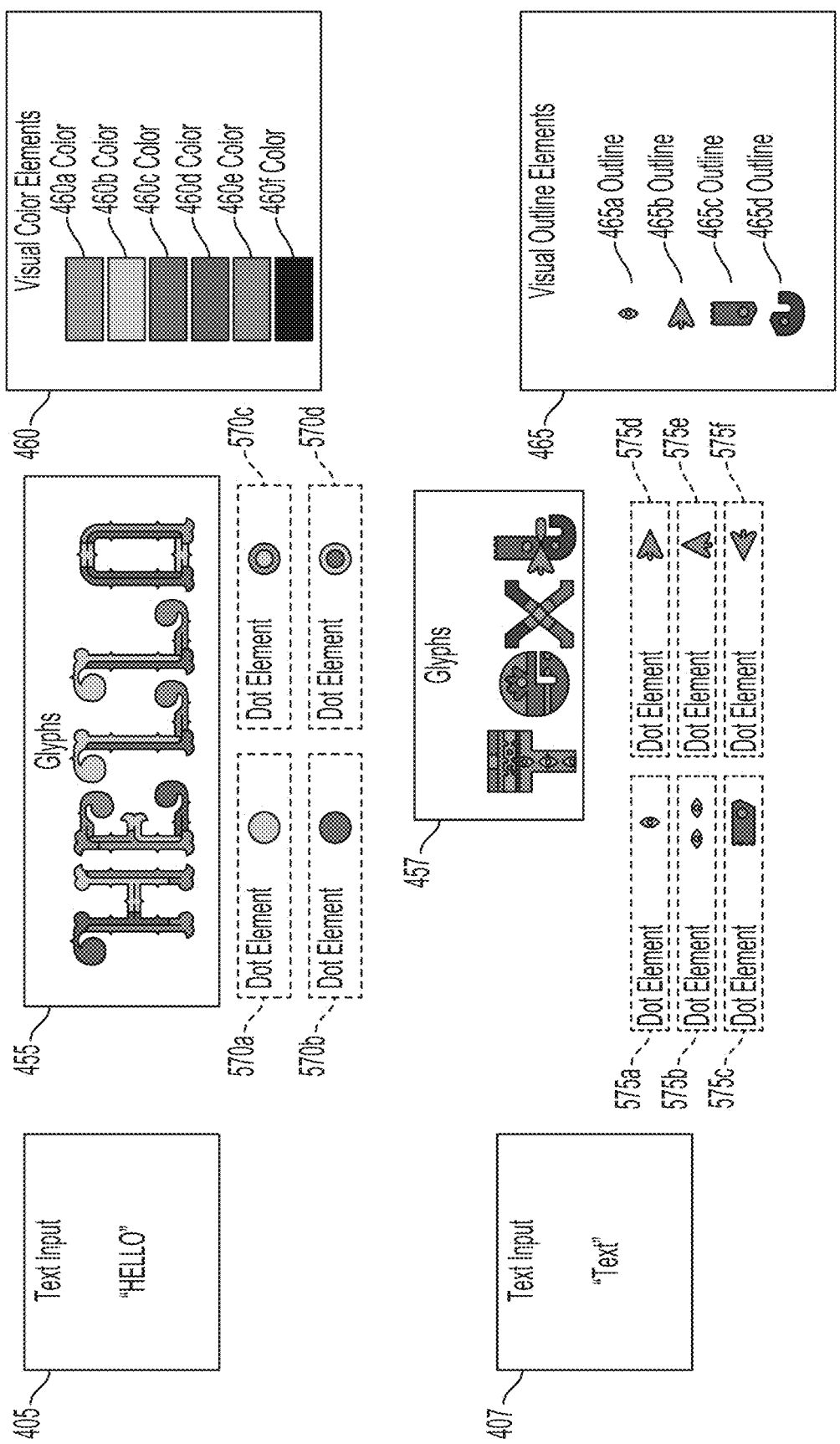
FIG. 5 is a block diagram depicting examples of responsive dot font effects generated from extracted visual elements, according to certain embodiments.

FIG. 5 depicts diagrammatic examples of responsive dot effects generated from extracted visual elements. The responsive dot effects could include graphical elements generated by a glyph extraction module. In some cases, a dot effect, such as a bullet point effect or a list dot effect, is generated or modified responsive to alphanumeric characters included in the text input. As described in regards to FIG. 4, the glyph extraction module extracts the visual color elements 460 from the glyphs 455, and extracts the visual outline elements 465 from the glyphs 457.

In some embodiments, the glyph extraction module generates one or more responsive dot effects that include at least one of the visual color elements 460. For example, the glyph extraction module generates graphical elements including a dot element 570a, a dot element 570b, a dot element 570c, and a dot element 570d, each of which includes at least one of the colors 460a-460f. The example dot elements 570a-570d are depicted as having a combination of at least two of the colors 460a-460f arranged as concentric shapes. In FIG. 5, the example dot elements 570a-570d are depicted as combinations of concentric circles, but other implementations are possible, such as combinations including rectangular shapes, diamond shapes, linear shapes (e.g., angle brackets, diagonal lines), non-concentric shapes, or any other suitable combination. In some cases, one or more particular colors included in the dot elements 570a-570d are selected responsive to an input, such as an input received by the user interface 110.

Additionally or alternatively, the glyph extraction module generates one or more responsive dot effects that include the visual outline elements 465. For example, the glyph extraction module generates graphical elements including one or more of the dot elements 575a, 575b, 575c, 575d, 575e, or 575f, each of which includes at least one of the outlines 465a-465d. In some cases, a dot element includes an outline element, a modified outline element, a combination of multiple outline elements, or multiple instances of an outline element. In some cases, a modified outline has one or more of a modified orientation (e.g., rotated), a modified color, a modified shape (e.g., removing a portion of the outline shape), a modified dimension, or any other suitable modification. The example dot element 575a is depicted as an instance of the outline 465a. The example dot element 575b is depicted as a combination of multiple modified (e.g., rotated) instances of the outline 465a. The example dot element 575c is depicted as a modified instance of the outline 465c. The example dot elements 575d, 575e, and 575f are depicted as respective instances of the outline 465b, dot elements 575e and 575f being modified instances. In some cases, one or more particular outlines included in the linear elements 575a-575f are selected responsive to an input, such as an input received by the user interface 110.

In some embodiments, a dot element has an orientation that is associated with a category of characters that are combined with the linear element. For example, one or more of the document authoring application 120 or the glyph extraction module 130 determines that the characters included in the text input 407 are categorized as being part of a directional written language, being part of a bulleted list, or being part of an enumerated list (e.g., noted by sequential numbers, sequential Roman numerals, sequential letters, or other sequential characters).

Responsive to determining that the characters are categorized as a left-to-right written language, one or more of the dot elements 575a-575f are identified as having a right-pointing orientation, such as one or more of the dot elements 575a, 575b, 575c, or 575d. Responsive to determining that the characters are categorized as a right-to-left written language, one or more of the dot elements 575a-575f are identified as having a left-pointing orientation, such as one or more of the dot elements 575a, 575b, or 575f. Responsive to determining that the characters are categorized as being a part of a bulleted list, one or more of the dot elements 575a-575f are identified as having a horizontal orientation, such as one or more of the dot elements 575a, 575b, 575c, 575d, or 575f. Responsive to determining that the characters are categorized as being part of an enumerated list, one or more of the dot elements 575a-575f are identified as having a vertical orientation, such as one or more of the dot elements 575a or 575e. Additional orientations will be apparent to those of skill in the art, such as directional orientations associated with left-justified text, right-justified text, languages written top-to-bottom, or any other suitable orientation.

In some embodiments, an extracted visual element that fulfills one or more thresholds is selected as a font effect. For example, the glyph extraction module 130 could select a particular visual element from the visual color elements 460 or the visual outline elements 465 based on the particular element's fulfillment of one or more thresholds associated with a font effect. In some cases, determining an extracted visual element's fulfillment of a threshold associated with a particular font effect improves an aesthetic suitability of the visual element for the particular font effect. For example, a visual element that fills thresholds associated with a bullet point effect may be determined to have aesthetic qualities that are suitable for generating the bullet point effect.

Figure 6:
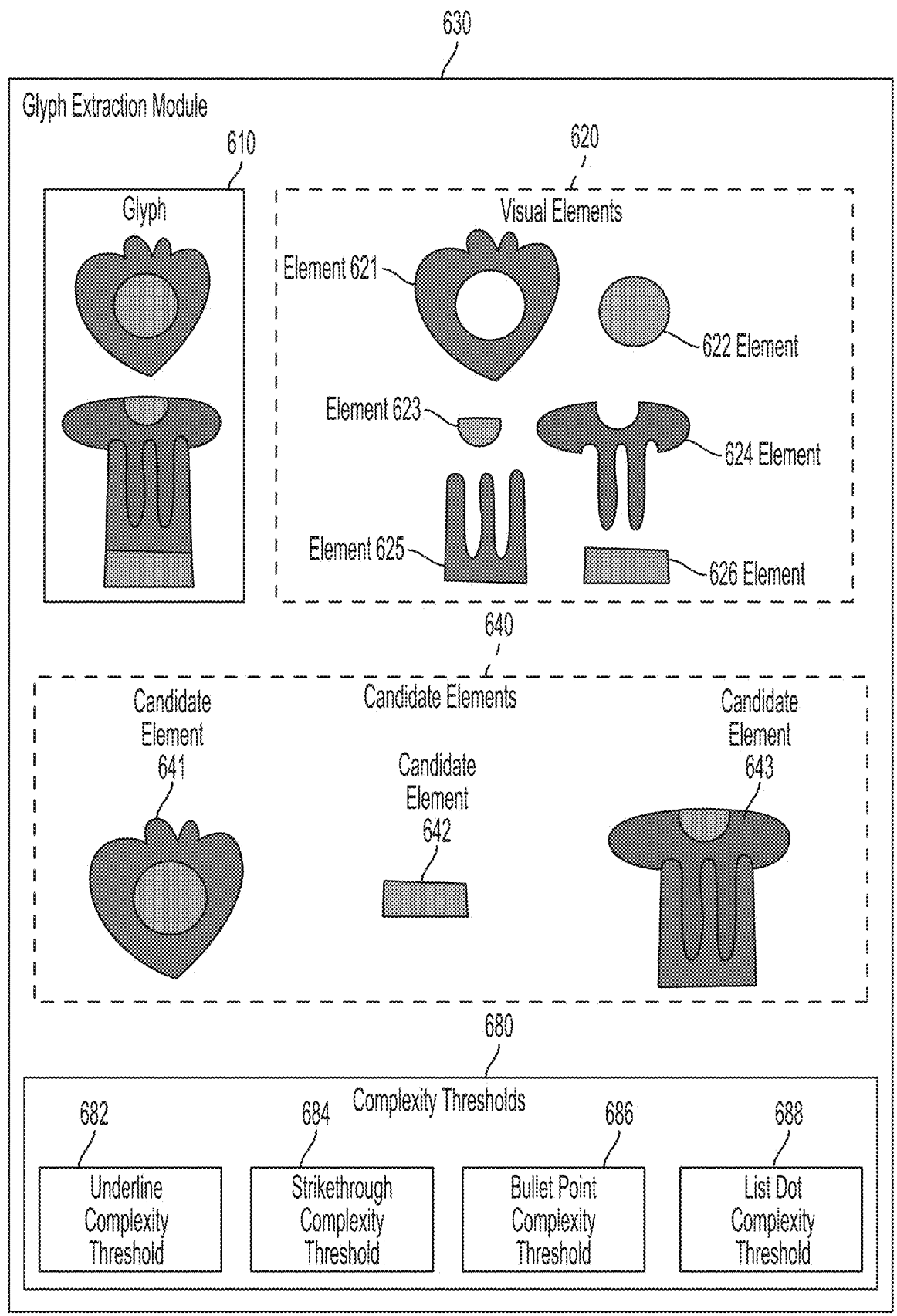
FIG. 6 is a block diagram depicting an example of a glyph extraction module 630 that is configured to determine a complexity of a visual element, according to certain embodiments.

FIG. 6 is a diagram depicting an example of a glyph extraction module 630 that is configured to determine a complexity of a visual element. In some embodiments, the complexity of a particular visual element is calculated from a quantity of vector paths included in the particular visual element. Additionally or alternatively, the complexity of the particular visual element is calculated from a quantity of open vector paths or a quantity of closed vector paths that are included in the particular visual element.

In some cases, the glyph extraction module 630 is included in a document authoring application. For instance, the glyph extraction module 630 may be an example of the glyph extraction module 130 included in the document authoring application 120, as described in regards to FIG. 1. The glyph extraction module 630 determines at least one glyph 610 from a font describing a typeface. In FIG. 6, the glyph 610 is included in a vector font, and has SVG data describing an appearance of an associated alphanumeric character. For example, and not by way of limitation, the glyph 610 could be associated with a character "i" that is included in a text input, such as the text input 105.

In FIG. 6, the glyph extraction module 630 extracts multiple visual elements 620 from the glyph 610. The visual elements 620 include elements corresponding to vector paths that are included in the glyph 610, such as an element 621, an element 622, an element 623, an element 624, an element 625, and an element 626. Each of the elements 621-626 includes one or more of a color or an outline that is associated with a respective corresponding vector path.

The glyph extraction module 630 determines one or more candidate elements 640 that include at least one of the visual elements 620, such as a candidate element 641 including a combination of elements 621 and 622, a candidate element 642 including the element 626, and a candidate element 643 including a combination of elements 623, 624, and 625.

The glyph extraction module 630 is configured to determine a complexity score of each of the candidate elements 640. In some cases, the complexity score of each of the candidate elements 640 is calculated from a quantity of vector paths included in the respective candidate element. For example, responsive to a determination that the candidate element 641 includes two vector paths associated with the elements 621 and 622, the glyph extraction module calculates that the candidate element 641 has a complexity score of 2. In addition, the candidate element 642 has a complexity score of 1 responsive to a determination that the candidate 642 has one vector path associated with the element 626, and the candidate element 643 has a complexity score of 3 responsive to a determination that the candidate 643 has three vector paths associated with the elements 623, 624, and 625. Additional complexity scores using different values or scales (e.g., percentages, range of 0-1) may be included in some implementations.

Additionally or alternatively, the glyph extraction module 630 is further configured to compare the respective complexity scores of the candidate elements 641, 642, and 643 to one or more complexity thresholds 680. In FIG. 6, the complexity thresholds 680 include at least one threshold associated with a particular type of font effect, such as an underline complexity threshold 682, a strikethrough complexity threshold 684, a bullet point complexity threshold 686, and a list dot complexity threshold 688. In some cases, a particular type of font effect is associated with multiple thresholds. For example, each of the complexity thresholds 682, 684, 686, and 688 include a respective maximum threshold and minimum threshold.

By comparing the complexity scores of the candidate elements 640 to the complexity thresholds 680, the glyph extraction module 630 determines a suitability of a particular candidate element for a particular type of font effect. In some cases, a particular candidate element that fulfills one or more thresholds for a first type of font effect fails to fulfill a threshold for a second type of font effect. As a non-limiting example, the underline complexity threshold 682 could include a minimum threshold of 1 and a maximum threshold of 2, and the bullet point complexity threshold 686 could include a minimum threshold of 2 and a maximum threshold of 3. In this example, the glyph extraction module 630 could determine that the candidate element 643 might be unsuitable as an underline effect (e.g., the complexity score of 3 does not fulfill the threshold 682) and might be suitable as a bullet point effect (e.g., the complexity score of 3 fulfills the threshold 686).

In some embodiments, multiple characteristics of an extracted visual element are compared to multiple types of thresholds associated with a particular font effect. By comparing the multiple characteristics of the extracted visual element to the multiple types of thresholds, the extracted visual element could be selected for the particular font effect.

Figure 7:
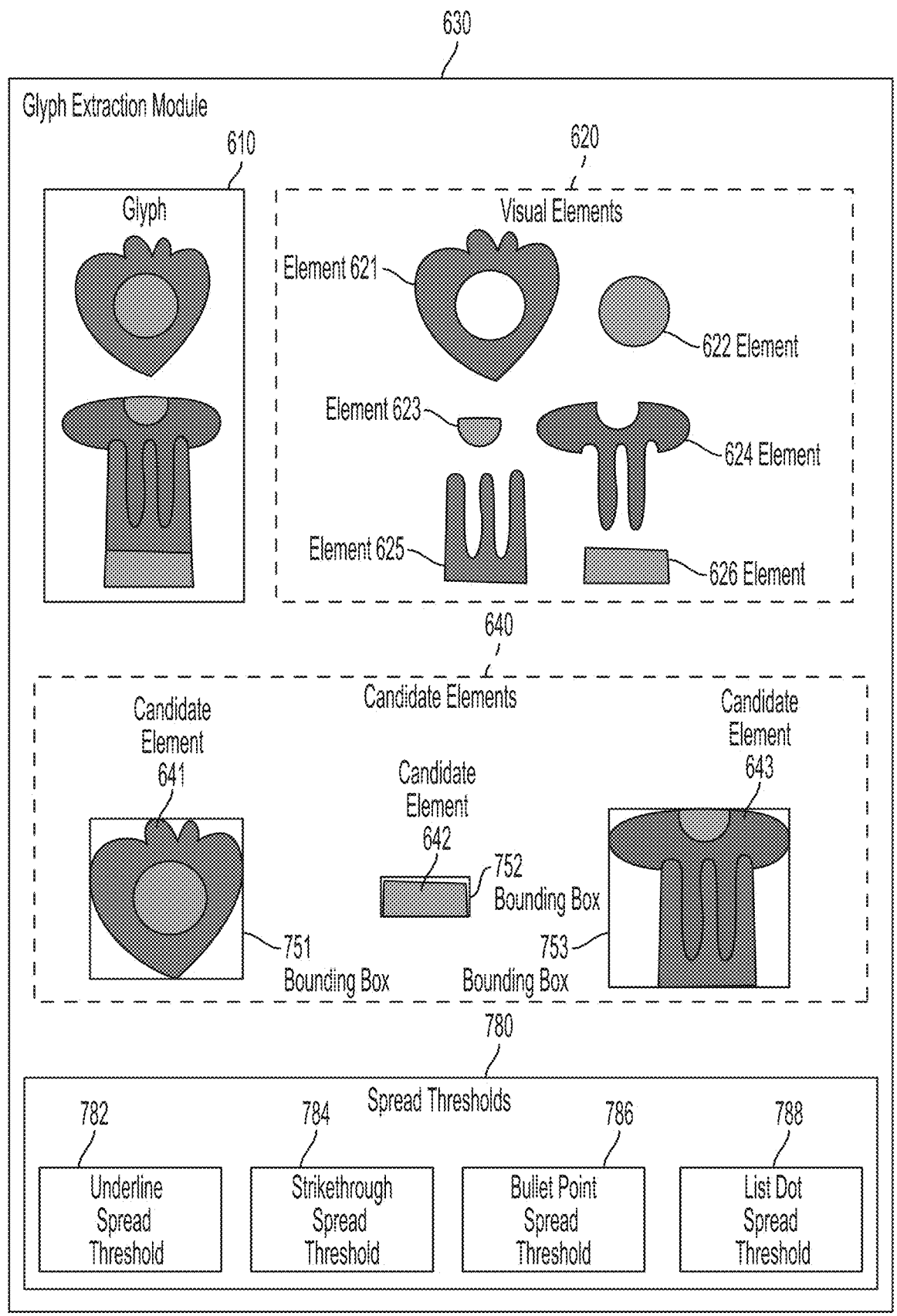
FIG. 7 is a block diagram depicting an example of a glyph extraction module 630 that is configured to determine a spread of a visual element, according to certain embodiments.

FIG. 7 is a diagram depicting an example of the glyph extraction module 630 that is configured to determine a spread of a visual element. In some embodiments, the spread of a particular visual element is determined by calculating a ratio of an area of the particular visual element compared to an area of a bounding box that encloses the particular visual element. As described in regards to FIG. 6, the glyph extraction module 630 determines the glyph 610 that is included in a vector font, and extracts the multiple visual elements 620 from the SVG data of the glyph 610. The glyph extraction module 630 determines the one or more candidate elements 640 that include at least one of the visual elements 620, such as the candidate element 641 including the elements 621 and 622, the candidate element 642 including the element 626, and the candidate element 643 including the elements 623, 624, and 625.

The glyph extraction module 630 is configured to determine a spread score of each of the candidate elements 640. In some cases, the spread score of each of the candidate elements 640 is calculated from a ratio of the area covered by the respective candidate element compared to the area of a bounding box that encloses the respective candidate element. For example, by calculating a first ratio of the areas of the candidate element 641 and a bounding box 741, the glyph extraction module 630 determines that the candidate element 641 has a spread score of about 0.4 (e.g., an area ratio of about 0.4). The candidate element 642 is determined to have a spread score of about 0.9 by calculating a second ratio of the areas of the candidate element 642 and a bounding box 742. The candidate element 643 is determined to have a spread score of about 0.6, by calculating a third ratio of the areas of the candidate element 643 and a bounding box 743. Additional spread scores using different values or scales (e.g., percentages, additional value ranges) may be included in some implementations.

In FIG. 7, the glyph extraction module 630 is further configured to compare the respective spread scores of the candidate elements 641, 642, and 643 to one or more spread thresholds 780. The spread thresholds 780 include at least one threshold associated with a particular type of font effect, such as an underline spread threshold 782, a strikethrough spread threshold 784, a bullet point spread threshold 786, and a list dot spread threshold 788. In some cases, a particular type of font effect is associated with multiple thresholds, such as a respective maximum threshold and minimum threshold for each of the spread thresholds 782, 784, 786, and 788.

By comparing the spread scores of the candidate elements 640 to the spread thresholds 780, the glyph extraction module 630 determines a suitability of a particular candidate element for a particular type of font effect. In some cases, a particular candidate element fulfills a threshold for a first type of font effect and fails to fulfill a threshold for a second type of font effect. As a non-limiting example, the underline spread threshold 782 could include a minimum threshold of about 0.5 and a maximum threshold of about 0.9, and the bullet point spread threshold 786 could include a minimum threshold of about 0.4 and a maximum threshold of about 0.7. In this example, the glyph extraction module 630 could determine that the candidate element 641 might be unsuitable as an underline effect (e.g., the spread score of about 0.4 does not fulfill the threshold 782) and might be suitable as a bullet point effect (e.g., the spread score of about 0.4 fulfills the threshold 786).

Figure 8:
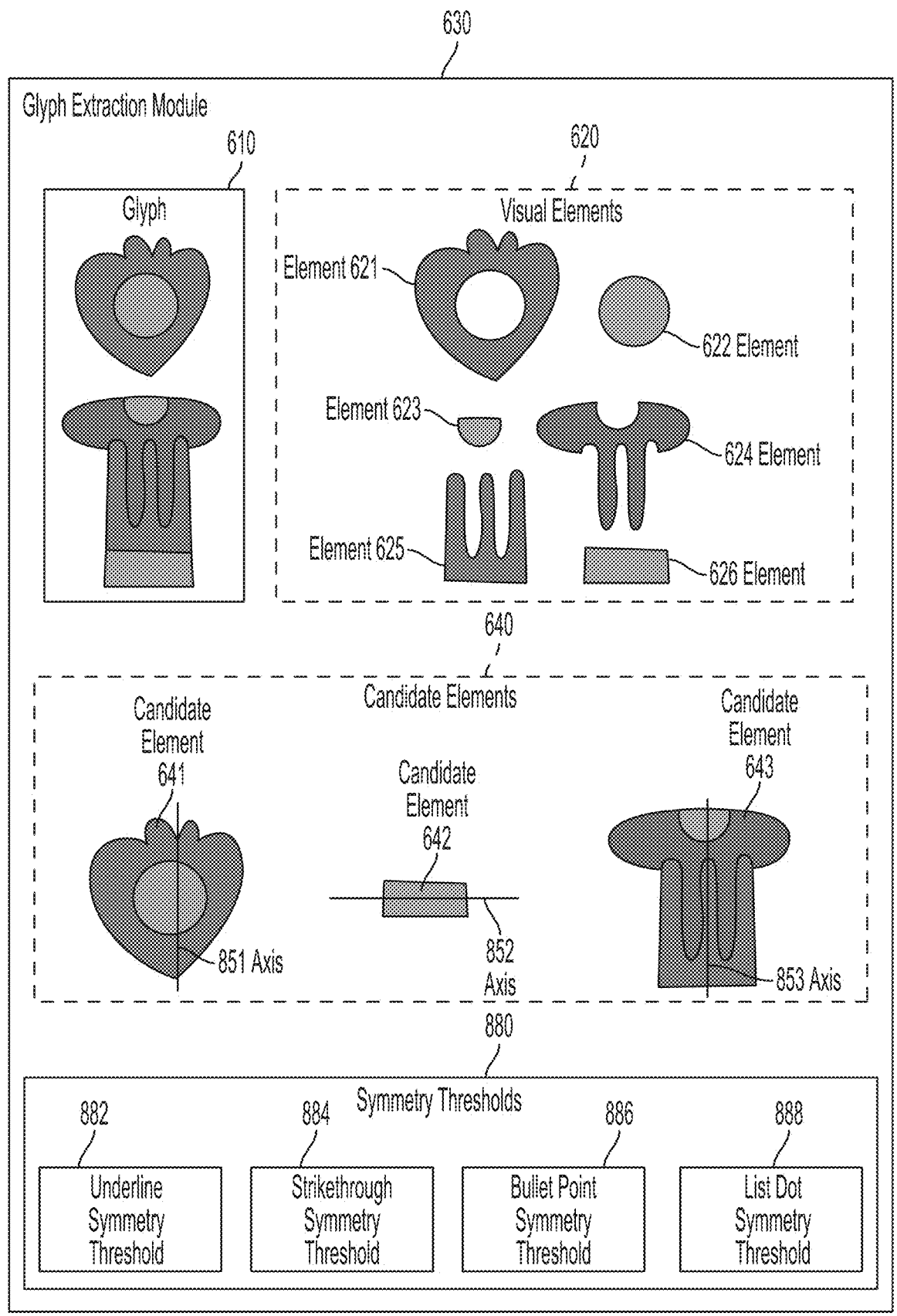
FIG. 8 is a block diagram depicting an example of a glyph extraction module 630 that is configured to determine a symmetry of a visual element, according to certain embodiments.

FIG. 8 is a diagram depicting an example of the glyph extraction module 630 that is configured to determine a symmetry of a visual element. In some embodiments, the symmetry of a particular visual element is determined by calculating a difference between two portions of the particular visual element divided by an axis. As a non-limiting example, the symmetry could be determined by calculating a peak signal-to-noise ratio determined between portions of the particular visual element, such as a left portion and a right portion, or a top portion and a bottom portion. As described in regards to FIG. 6, the glyph extraction module 630 determines the glyph 610 that is included in a vector font, and extracts the multiple visual elements 620 from the SVG data of the glyph 610. The glyph extraction module 630 determines the one or more candidate elements 640 that include at least one of the visual elements 620, such as the candidate element 641 including the elements 621 and 622, the candidate element 642 including the element 626, and the candidate element 643 including the elements 623, 624, and 625.

The glyph extraction module 630 is configured to determine a symmetry score of each of the candidate elements 640. In some cases, the symmetry score of each of the candidate elements 640 is calculated from a ratio between two portions of the respective candidates element, such as a left portion compared to a right portion, or a top portion compared to a bottom portion. In some cases, the respective symmetry scores of each of the candidate elements 640 are calculated from a ratio between two portions of the respective candidate element that are divided by an axis. The axis could be a horizontal axis, a vertical axis, or an axis having an additional orientation (e.g., diagonal). In some cases, the symmetry score of a particular candidate element is calculated from a symmetry around an axis that provides the highest ratio between the two portions (e.g., the axis that provides the highest symmetry).

For example, by calculating a first ratio of left and right portions of the candidate element 641 divided by a vertical axis 851, a symmetry score of the candidate element 641 is about 0.85. By calculating a second ratio of top and bottom portions of the candidate element 642 divided by a horizontal axis 852, a symmetry score of the candidate element 642 is about 0.95. By calculating a third ratio of left and right portions of the candidate element 643 divided by a vertical axis 853, the symmetry score of the candidate element 643 is about 0.75. Additional symmetry scores using different values or scales (e.g., percentages, additional value ranges) may be included in some implementations.

In FIG. 8, the glyph extraction module 630 is further configured to compare the respective symmetry scores of the candidate elements 641, 642, and 643 to one or more symmetry thresholds 880. The symmetry thresholds 880 include at least one threshold associated with a particular type of font effect, such as an underline symmetry threshold 882, a strikethrough symmetry threshold 884, a bullet point symmetry threshold 886, and a list dot symmetry threshold 888. In some cases, a particular type of font effect is associated with multiple thresholds, such as respective maximum threshold and minimum threshold for each of the symmetry thresholds 882, 884, 886, and 888.

By comparing the symmetry scores of the candidate elements 642 to the symmetry thresholds 880, the glyph extraction module 630 determines suitability for a particular candidate element for a particular type of font effect. In some cases, a particular candidate element fulfills a threshold for a first type of font effect and fails to fulfill a threshold for a second type of font effect. As a non-limiting example, the underline symmetry threshold 882 could include a minimum threshold of about 0.9 and a maximum threshold of about 1.0, and the bullet point symmetry threshold 886 could include a minimum threshold of about 0.7 and a maximum threshold of about 0.9. In this example, the glyph extraction module 630 could determine that the candidate element 641 might be unsuitable as an underline effect (e.g., the symmetry score of about 0.85 does not fulfill the threshold 882) and might be suitable as a bullet point effect (e.g., the symmetry score of about 0.85 fulfills the threshold 886).

Figure 9:
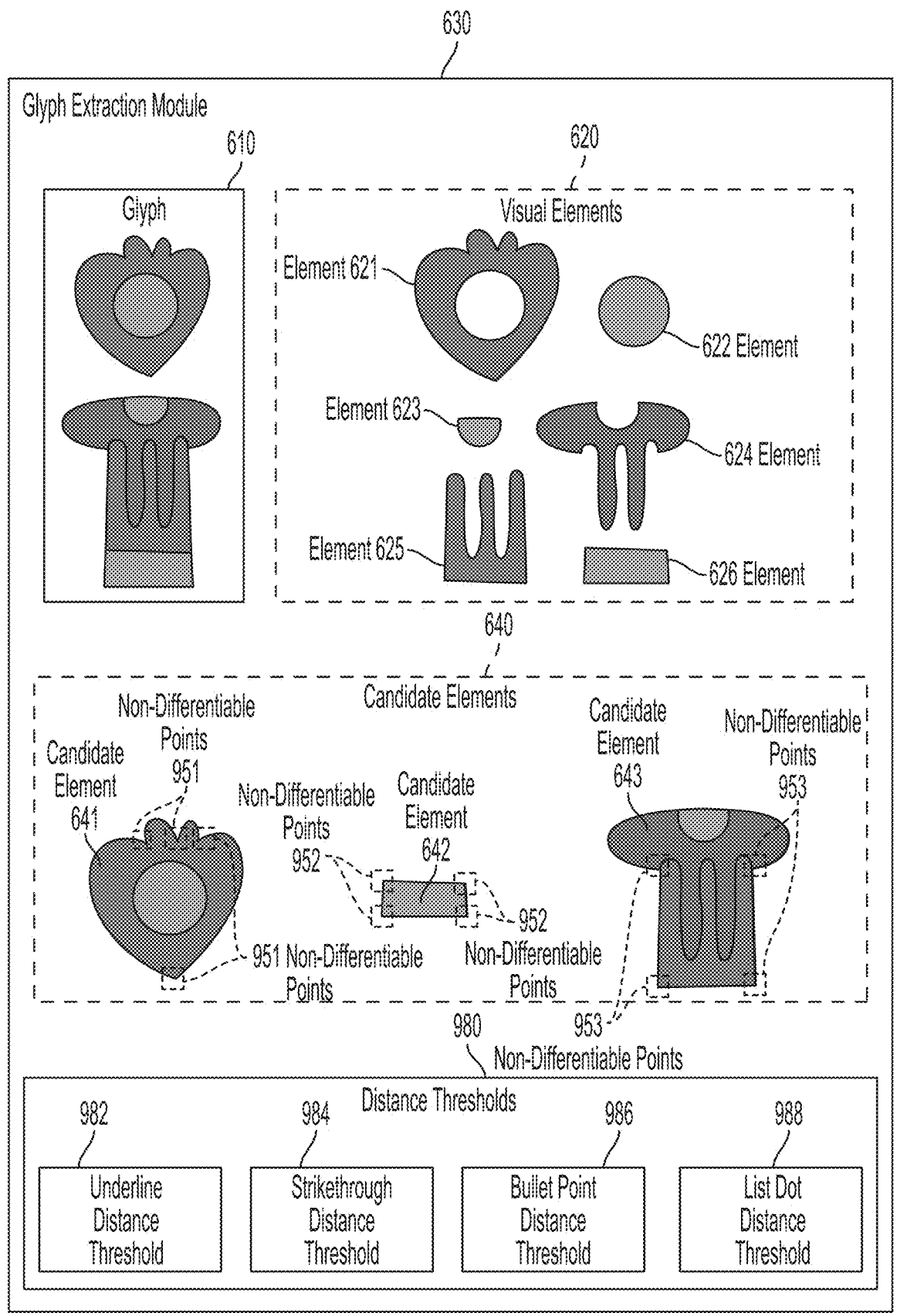
FIG. 9 is a block diagram depicting an example of a glyph extraction module 630 that is configured to determine non-differentiable points of a visual element, according to certain embodiments.

FIG. 9 is a diagram depicting an example of the glyph extraction module 630 that is configured to determine one or more non-differentiable points of a visual element. In some embodiments, the non-differentiable points of a particular visual element are determined by calculating a differentiation of an outline of the particular visual element, such as a mathematical differentiation of the vector path describing the outline. As described in regards to FIG. 6, the glyph extraction module 630 determines the glyph 610 that is included in a vector font, and extracts the multiple visual elements 620 from the SVG data of the glyph 610. The glyph extraction module 630 determines the one or more candidate elements 640 that include at least one of the visual elements 620, such as the candidate element 641 including the elements 621 and 622, the candidate element 642 including the element 626, and the candidate element 643 including the elements 623, 624, and 625.

The glyph extraction module 630 is configured to determine a quantity of non-differentiable points for each of the candidate elements 640. In some cases, the quantity of non-differentiable points for each of the candidate elements 640 is calculated from a mathematical differentiation (e.g., determining a slope) of the outline of the respective candidate element. A non-differentiable point is determined at a location on the outline where mathematical differentiation cannot be completed, such as an endpoint of a particular path of the outline. For example, by calculating one or more differentiations of outline portions for the candidate element 641, the glyph extraction module 630 determines that the candidate element 641 has non-differentiable points 951. By calculating one or more differentiations of outline portions for the candidate element 642, the candidate element 642 is determined to have non-differentiable points 952. By calculating one or more differentiations of outline portions for the candidate element 643, the candidate element 643 is determined to have non-differentiable points 953.

In some cases, the glyph extraction module 630 determines that one or more of the non-differentiable points for a respective candidate element are within a threshold distance of a symmetry axis, such as one or more of the axes 851, 852, or 853. For example, two of the non-differentiable points 951 may be found to be within a threshold distance from the vertical axis 851 (e.g., points closest to the vertical axis of the candidate element 641), and an additional two of the non-differentiable points 951 may be found to be outside of the threshold distance from the axis 851. In some cases, a non-differentiable point is within a threshold distance with respect to a first axis, and outside of the threshold distance with respect to a second axis. For example, all of the non-differentiable points 952 may be found to be within a threshold distance from the horizontal axis 852 and outside of the threshold distance from an additional vertical axis of the candidate element 242. A candidate element that has one or more non-differentiable points may not have a non-differentiable point that is within a threshold distance of an axis of the candidate element. For example, the glyph extraction module 630 may determine that none of the non-differentiable points 953 are within the threshold distance from the axis 853 of the candidate element 643.

In FIG. 9, the glyph extraction module 630 is further configured to compare locations of the respective non-differentiable points of the candidate elements 641, 642, and 643 to one or more distance thresholds 980. In some cases, the distance thresholds 980 are compared to a distance between an axis of the respective candidate element and the locations of the non-differentiable points for the respective candidate element. The distance thresholds 980 include at least one threshold associated with a particular type of font effect, such as an underline distance threshold 982, a strikethrough distance threshold 984, a bullet point distance threshold 986, and a list dot distance threshold 988. In some cases, a particular type of font effect is associated multiple thresholds, such as a respective maximum threshold and minimum threshold for each of the distance thresholds 982, 984, 986, and 988.

By comparing the distance thresholds 982 to the locations of the non-differentiable points of the candidate elements 640, the glyph extraction module 630 determines a suitability of a particular candidate element for particular type of font effect. In some cases, a particular candidate element fulfills a threshold for a first type of font effect and fails to fulfill threshold for a second type of font effect. As a non-limiting example, the glyph extraction module 630 could determine that the candidate element 641 might be suitable as a bullet point effect, based on having at least one non-differentiable point 951 within the bullet point distance threshold 986 from an axis of the candidate element 641.

In some embodiments, the glyph extraction module 630 determines a suitability of a particular candidate element for particular type of font effect by calculating multiple evaluations of multiple characteristics of the particular candidate element. For example, the glyph extraction module 630 performs multiple calculations comparing characteristics of the candidate elements 640 to each of the thresholds 680, 780, 880, and 980. One or more of the candidate elements 640 can be assigned to a font effect responsive to outcomes of the multiple calculations performed by the glyph extraction module 630. In some cases, a particular candidate element that fulfills a quantity of thresholds for a particular font effect is determined to be suitable for the particular font effect. For example, responsive to determining that the candidate element 641 fulfills at least three (or another suitable quantity) thresholds associated with a bullet point font effect, the glyph extraction module determines that the candidate element 641 is suitable for a bullet point font effect. By comparing multiple characteristics of a candidate element to the thresholds 680, 780, 880, and 980, the glyph extraction module 630 may implement a ruleset to automatically determine whether each of the candidate elements 640 is suitable to be applied to one or more of a underline font effect, a strikethrough font effect, a bullet point font effect, or a list dot font effect.

Figure 10:
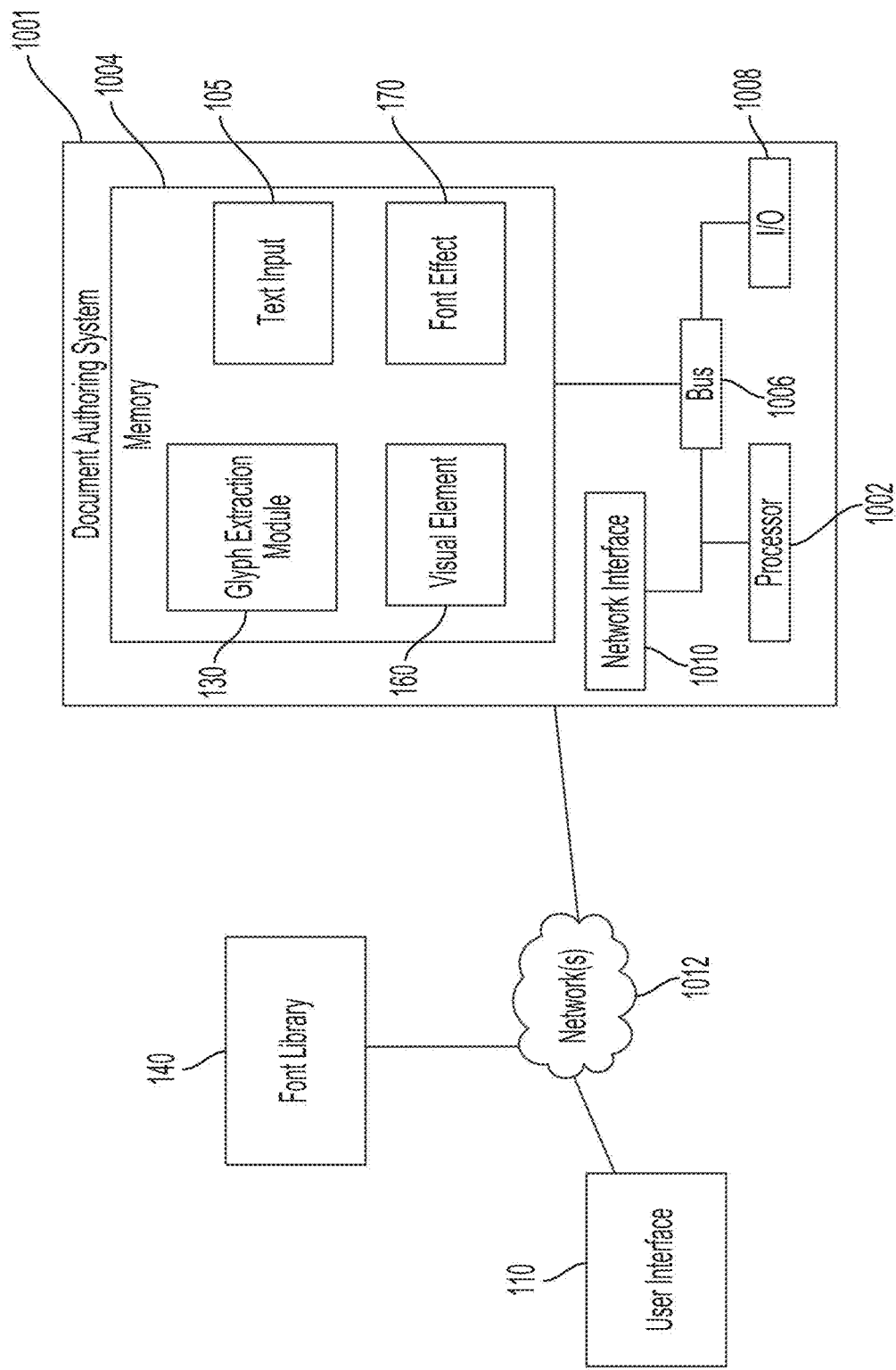
FIG. 10 is a block diagram depicting an example of a computing system for implementing a document authoring system, according to certain embodiments.

Any suitable computing system or group of computing systems can be used for performing the operations described herein. For example, FIG. 10 is a block diagram depicting a computing system that is configured to implement a document authoring system 1001, according to certain embodiments.

The depicted example of the document authoring system 1001 includes one or more processors 1002 communicatively coupled to one or more memory devices 1004. The processor 1002 executes computer-executable program code or accesses information stored in the memory device 1004. Examples of processor 1002 include a microprocessor, an application-specific integrated circuit ("ASIC"), a field-programmable gate array ("FPGA"), or other suitable processing device. The processor 1002 can include any number of processing devices, including one.

The memory device 1004 includes any suitable non-transitory computer-readable medium for storing the glyph extraction module 130, the text input 105, the visual element 160, the font effect 170, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The document authoring system 1001 may also include a number of external or internal devices such as input or output devices. For example, the document authoring system 1001 is shown with an input/output ("I/O") interface 1008 that can receive input from input devices or provide output to output devices. A bus 1006 can also be included in the document authoring system 1001. The bus 1006 can communicatively couple one or more components of the document authoring system 1001.

The document authoring system 1001 executes program code that configures the processor 1002 to perform one or more of the operations described above with respect to FIGS. 1-9. The program code includes operations related to, for example, one or more of the glyph extraction module 130, the text input 105, the visual element 160, the font effect 170, or other suitable applications or memory structures that perform one or more operations described herein. The program code may be resident in the memory device 1004 or any suitable computer-readable medium and may be executed by the processor 1002 or any other suitable processor. In some embodiments, the program code described above, the glyph extraction module 130, the text input 105, the visual element 160, and the font effect 170 are stored in the memory device 1004, as depicted in FIG. 10. In additional or alternative embodiments, one or more of the glyph extraction module 130, the text input 105, the visual element 160, the font effect 170, and the program code described above are stored in one or more memory devices accessible via a data network, such as a memory device accessible via a cloud service.

The document authoring system 1001 depicted in FIG. 10 also includes at least one network interface 1010. The network interface 1010 includes any device or group of devices suitable for establishing a wired or wireless data connection to one or more data networks 1012. Non-limiting examples of the network interface 1010 include an Ethernet network adapter, a modem, and/or the like. The document authoring system 1001 is able to communicate with one or more additional computing systems using the network interface 1010, such as computing systems implementing one or more of the font library 140 or the user interface 110. Although FIG. 10 depicts the font library 140 and the user interface 110 as connected to document authoring system 1001 via the networks 1012, other embodiments are possible, including one or more of the font library 140 or the user interface 110 running as a program in the memory 1004 of document authoring system 1001.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of producing a responsive font effect consistent with a font, the method comprising:
   receiving a text input that includes at least one alphanumeric character;
   determining, from a font describing a typeface applied to the text input, graphical data describing a glyph of the at least one alphanumeric character;
   extracting, from the graphical data, a visual element included in the glyph, the visual element including an outline of a portion of the glyph;
   generating a linear element based on the outline;
   modifying the linear element to have an effect length based on a character length associated with the at least one alphanumeric character;
   calculating a complexity score for the visual element;
   generating, using the linear element as modified, and subject to the complexity score as compared to a complexity threshold, a responsive font effect that includes the extracted visual element applied to an undefined character for the typeface, wherein the undefined character comprises one or more of: an underline, a strikethrough, a bullet point, or a list dot; and
   updating a user interface to display the undefined character with an appearance corresponding to the responsive font effect.

2. The method of claim 1, further comprising:
   receiving an additional text input that includes a modification of the text input;
   determining an additional glyph of an additional alphanumeric character associated with the modification of the text input;
   extracting, from additional graphical data describing the additional glyph, an additional visual element included in the additional glyph;
   modifying the responsive font effect, wherein the modified responsive font effect includes the extracted additional visual element; and
   updating the user interface to display the modified responsive font effect concurrent with the text input and the additional text input.

3. The method of claim 1, further comprising:
   updating the user interface to display an additional responsive font effect that includes an additional extracted visual element;
   receiving, via the user interface, a selection indicating the responsive font effect or the additional responsive font effect; and
   updating, responsive to receiving the selection, the user interface to display the indicated one of the responsive font effect or the additional responsive font effect concurrent with the text input.

4. The method of claim 1, wherein:
   the font describing the typeface is a vector font,
   the visual element includes multiple colors, and
   the responsive font effect includes a combination of the multiple colors.

5. The method of claim 1, wherein the visual element includes multiple colors, the method further comprising:
   updating the user interface to display the multiple colors; and
   receiving, via the user interface, a selection of one or more of the multiple colors,
   wherein the responsive font effect includes the selected one or more of the multiple colors.

6. The method of claim 1, wherein the visual element includes the outline of the portion of the glyph,
   the method further comprising receiving, via the user interface, a selection of the portion of the glyph, wherein the outline of the portion of the glyph includes the selected portion.

7. The method of claim 1, wherein the visual element includes a color.

8. The method of claim 1, wherein generating the responsive font effect further comprises:
   generating a lateral combination of the outline, the lateral combination including multiple lateral instances of the outline; and modifying the lateral combination to have an effect length based on the character length.

9. A non-transitory computer-readable medium embodying program code for producing a responsive font effect consistent with a font, the program code comprising instructions which, when executed by a processor, cause the processor to perform operations comprising:
receiving a text input that includes at least one alphanumeric character;
determining, from a font describing a typeface applied to the text input, graphical data describing a glyph of the at least one alphanumeric character;
extracting, from the graphical data, a visual element included in the glyph, the visual element including an outline of a portion of the glyph;
generating a linear element based on the outline;
modifying the linear element to have an effect length based on a character length associated with the at least one alphanumeric character;
calculating a complexity score for the visual element;
generating, using the linear element as modified, and subject to the complexity score as compared to a complexity threshold, a responsive font effect that includes the extracted visual element applied to an undefined character for the typeface, wherein the undefined character comprises one or more of: an underline, a strikethrough, a bullet point, or a list dot; and
updating a user interface to display the undefined character with an appearance corresponding to the responsive font effect.

10. The non-transitory computer-readable medium of claim 9, the operations further comprising:
receiving an additional text input that includes a modification of the text input;
determining an additional glyph of an additional alphanumeric character associated with the modification of the text input;
extracting, from additional graphical data describing the additional glyph, an additional visual element included in the additional glyph;
modifying the responsive font effect, wherein the modified responsive font effect includes the extracted additional visual element; and
updating the user interface to display the modified responsive font effect concurrent with the text input and the additional text input.

11. The non-transitory computer-readable medium of claim 9, the operations further comprising:
updating the user interface to display an additional responsive font effect that includes an additional extracted visual element;
receiving, via the user interface, a selection indicating the responsive font effect or the additional responsive font effect; and
updating, responsive to receiving the selection, the user interface to display the indicated one of the responsive font effect or the additional responsive font effect concurrent with the text input.

12. The non-transitory computer-readable medium of claim 9, wherein:
the font describing the typeface is a vector font,
the visual element includes multiple colors, and
the responsive font effect includes a combination of the multiple colors.

13. The non-transitory computer-readable medium of claim 9, wherein the visual element includes multiple colors, and the operations further comprise:
updating the user interface to display the multiple colors; and
receiving, via the user interface, a selection of one or more of the multiple colors,
wherein the responsive font effect includes the selected one or more of the multiple colors.

14. The non-transitory computer-readable medium of claim 9, wherein generating the responsive font effect further comprises:
generating a lateral combination of the outline, the lateral combination including multiple lateral instances of the outline; and
modifying the lateral combination to have an effect length based on the character length.

15. A system for producing a responsive font effect consistent with a font, the system comprising:
a processor configured for receiving a text input that includes at least one alphanumeric character;
a means for determining, from a font describing a typeface applied to the text input, graphical data describing a glyph of the at least one alphanumeric character;
a means for extracting, from the graphical data, a visual element included in the glyph, the visual element including an outline of a portion of the glyph;
means for generating a linear element based on the outline;
means for modifying the linear element to have an effect length based on a character length associated with the at least one alphanumeric character;
means for calculating a complexity score for the visual element; and
a means for generating, using the linear element as modified, and subject to the complexity score as compared to a complexity threshold, a responsive font effect that includes the extracted visual element applied to an undefined character for the typeface, wherein the undefined character comprises one or more of: an underline, a strikethrough, a bullet point, or a list dot,
wherein the processor is further configured for updating a user interface to display the undefined character with an appearance corresponding to the responsive font effect.

16. The system of claim 15, wherein:
the processor is further configured for receiving an additional text input that includes a modification of the text input, and
the system further comprises:
a means for determining an additional glyph of an additional alphanumeric character associated with the modification of the text input;
a means for extracting, from additional graphical data describing the additional glyph, an additional visual element included in the additional glyph; and
a means for modifying the responsive font effect, wherein the modified responsive font effect includes the extracted additional visual element,
wherein the processor is further configured for updating the user interface to display the modified responsive font effect concurrent with the text input and the additional text input.

17. The system of claim 15, wherein the processor is further configured for:
updating the user interface to display an additional responsive font effect that includes an additional extracted visual element;

receiving, via the user interface, a selection indicating the responsive font effect or the additional responsive font effect; and updating, responsive to receiving the selection, the user interface to display the indicated one of the responsive font effect or the additional responsive font effect concurrent with the text input.

18. The system of claim 15, wherein:

the font describing the typeface is a vector font, the visual element includes multiple colors, and the responsive font effect includes a combination of the multiple colors.

19. The system of claim 15, wherein the visual element includes multiple colors, the processor being further configured for:

updating the user interface to display the multiple colors; and receiving, via the user interface, a selection of one or more of the multiple colors, wherein the responsive font effect includes the selected one or more of the multiple colors.

20. The system of claim 15, wherein the visual element includes the outline of the portion of the glyph, the processor being further configured for receiving, via the user interface, a selection of the portion of the glyph, wherein the outline of the portion of the glyph includes the selected portion.

\* \* \* \* \*